United States Patent [19]

Lax et al.

[11] Patent Number: 4,469,915
[45] Date of Patent: Sep. 4, 1984

[54] BEEPER SIMULATOR FOR A TELEPHONE ANSWERING APPARATUS

[76] Inventors: Jacob Lax, 1013 E. 26th St., Brooklyn, N.Y. 11210; Sandor Goldner, 1251 46th St., Brooklyn, N.Y. 11219

[21] Appl. No.: 419,788

[22] Filed: Sep. 20, 1982

[51] Int. Cl.³ .................... H04M 1/65; H04M 11/00
[52] U.S. Cl. .................................. 179/2 A; 179/6.1; 179/6.11
[58] Field of Search .................. 179/2 A, 2 AM, 6.11, 179/6.12, 6.08, 6.09, 6.1, 6.14, 2 C, 2 DP, 84 VF, 6.07, 6.16

[56] References Cited

U.S. PATENT DOCUMENTS 3,614,326 10/1971 Cameron ............................ 179/2 A
3,842,208 10/1974 Paraskevakos ................. 179/2 A X
4,122,305 10/1978 Fish et al. ....................... 179/2 A X
4,122,306 10/1978 Friedman et al. ............. 179/6.11 X Primary Examiner—G. Z. Rubinson
Assistant Examiner—W. J. Brady
Attorney, Agent, or Firm—Goodman & Teitelbaum

[57] ABSTRACT

A beeper simulator for a telephone answering apparatus which produces onto the telephone line a beeper signal to operate the apparatus in response to digits being dialed onto the telephone from a remote telephone. When preselected digits representing a code are entered onto a remote telephone, the digits are detected by the beeper simulator. It then causes a signal generating means to emit the particular beeper signal needed for operation of the telephone answering apparatus. The beeper simulator can be initialized so that it will produce the particular beeper signal needed to operate the particular telephone answering apparatus.

15 Claims, 4 Drawing Figures

BEEPER SIMULATOR FOR A TELEPHONE ANSWERING APPARATUS

BACKGROUND OF THE INVENTION

This invention relates to telephone answering systems, and more particularly to a beeper simulator for a telephone answering apparatus whereby the need for carrying an individual beeper to obtain recorded messages is thereby eliminated.

Telephone answering apparatus are readily available for use on all types of telephone lines. Typically, the telephone answering apparatus is installed and is available for providing an outgoing message indicating the absence of the answering party and is available for recording a number of incoming messages. When the answering party returns to the premises, he can easily obtain his messages by playing back the recorded messages left on the machine.

Since on many occasions the answering party desires to obtain his messages without returning to the machine itself, most telephone answering apparatus provide a beeper device which is carried by the answering party. At any remote telephone location, the answering party dials his own telephone number and upon connection to his own telephone answering apparatus, he places the beeper device near the speaker of the telephone he is using and has the beeper emit a signal onto the telephone line. This beeper signal is of a particular frequency to which the telephone apparatus is preset. Upon receipt of that particular beeper signal, the telephone answering apparatus will rewind and play back the messages.

Many beeper devices are provided with two different signals in order to control two different aspects of the telephone answering apparatus. One beeper signal is for rewinding and playing back the messages, as previously described. The other beeper signal is used for back spacing and changing the outgoing message on the telephone apparatus.

While the use of the beeper device is very beneficial, the need for carrying the beeper device is quite awkward. Frequently, the answering party may forget to carry his beeper device and thereby not be able to obtain his messages. At other times, there may be so much noise around the telephone being used that the sounds emitted from the beeper are inaudible because of the background noise. A most important problem is that the beeper may be lost and, someone finding the beeper and knowing the telephone number may be able to utilize the beeper to obtain all of the messages.

Accordingly, it would be convenient to avoid the use of the beeper device and yet obtain the benefits of being able to remotely inquire the apparatus to obtain messages. One solution to this problem is as described in U.S. Pat. No. 4,122,306 issued to the inventors of the present invention. In that patent, there is described a telephone answering apparatus which responds to digits dialed onto a remote telephone handset. By dialing predetermined coded digits, the telephone answering apparatus will respond in various aspects. Specified digits will cause the machine to rewind and play back the message while others would be used to change messages.

While the apparatus of the above patent resolves the problem of carrying around a beeper, unfortunately, many individuals have already installed other telephone answering apparatus which do not respond to the coded number set forth in that patent, but only respond to the beeper signal of their apparatus. Additionally, most of the currently available telephone answering apparatus are still of the type responding only to beeper signals and thus, those particular apparatus cannot benefit from the coding scheme set forth in the above U.S. Pat. No. 4,122,306.

Accordingly, there is still the need of a device which can eliminate the necessity for carrying the beeper device and at the same time can be utilized with any type of telephone answering apparatus which now utilizes a beeper.

SUMMARY OF THE INVENTION

It is accordingly, an object of the present invention to provide a beeper simulator for a telephone answering apparatus.

A further object of the present invention is to provide a device which can be used with standard telephone answering apparatus so as to eliminate the need for carrying a beeper and at the same time provide the benefits of remote inquiry of the telephone answering apparatus.

Yet a further object of the present invention is to provide a beeper simulator for a telephone answering apparatus which can convert specified digits dialed onto a remote telephone into the particular beeper signal required by the telephone answering apparatus.

A further object of the present invention is to provide a beeper simulator for a telephone answering apparatus which uses preselected numbers dialed onto a remote telephone handset to cause the beeper signal to be produced and wherein the preselected numbers can be changed by the user.

Yet a further object of the present invention is to provide a beeper simulator for a telephone answering apparatus which can interconnect to a standard telephone answering apparatus and which will produce the beeper signal needed by the telephone answering apparatus without the need for the user carrying around the beeper device.

These and other objects, features and advantages of the invention will, in part, be pointed out with particularity and will, in part, become obvious from the following more detailed description of the invention, taken in conjunction with the accompanying drawings, which form an integral part thereof.

Briefly, the present invention describes a beeper simulator for a telephone answering apparatus which includes a detecting circuit for interconnection to a telephone line. The detection circuit detects particular digits entered into the telephone line by a caller. These digits can be preselected so as to represent particular codes. A signal generating circuit is also included which interconnects to the telephone line and responds to the detection of the preselected coded digits by the detecting circuit. In response thereto, the signal generating means produces onto the telephone line, an output beeper signal which is required for operation of specified aspects of the telephone answering apparatus.

In an embodiment of the invention, a signal setting circuit is also included which is coupled to the signal generating circuit and responds to an output signal from the beeper being simulated. The signal generating means is then set to produce a similar beeper output signal.

Utilizing the device of the present invention, the standard beeper provided with the telephone answering apparatus is initially utilized by playing its beeper signal into the signal setting circuit and adjusting the signal setting circuit of the present beeper simulator to produce an identical beeper signal. Then, with preselected digits being encoded for detection, when those digits are dialed, the beeper simulator detects those dialed digits and produces the preset beeper signal which is required by the telephone answering apparatus.

Two separate beeper signals can be preset so that the usual two signals needed by the telephone answering apparatus can be produced. Two separate encoding numbers can be preset to respectively produce these two different beeper signals.

BRIEF DESCRIPTION OF THE DRAWINGS

In the drawings.

In the various figures of the drawing, like reference characters designate like parts.

DESCRIPTION OF THE PREFERRED EMBODIMENT

Figure 1:
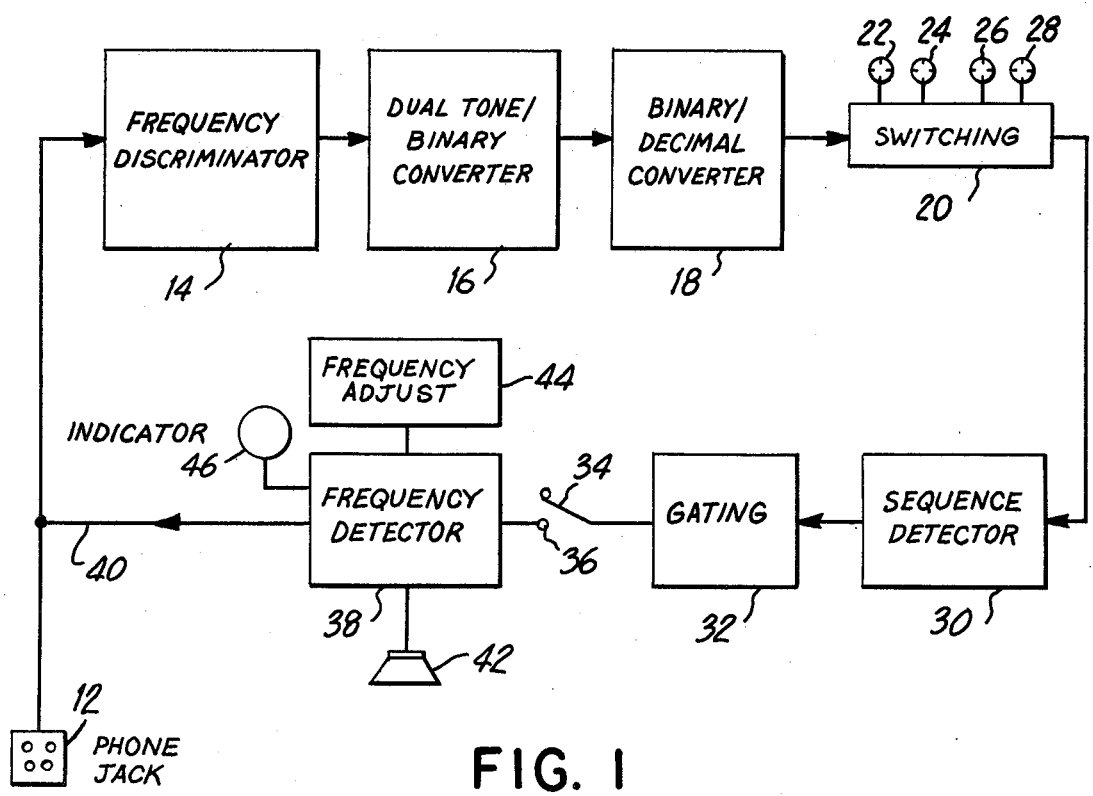
FIG. 1 is a block diagram explaining the general operation of the beeper simulator in accordance with one aspect of the present invention.

Referring now to FIG. 1, there is shown a block diagram of the beeper simulator in accordance with a first embodiment. The beeper is connected to the telephone line by means of a telephone jack 12. When the telephone number is called, the standard telephone answering apparatus will answer. At that point, the present beeper simulator will be connected onto the line. As digits are then dialed onto the line, if they are of the multifrequency type, and specifically of the Touch Tone Type, the digits will each have two frequencies which are placed on the line. The frequency discriminator 14 will detect the two frequencies and separate them into the two individual frequencies making up each digit. The particular two frequencies of the digit dialed is then converted into a binary number by the dial tone to binary converter 16. This number is then converted to a decimal number by the binary to decimal converter 18.

The switching unit 20 includes presettable dials 22–28 on which four digits can be entered. In this manner, the particular switching unit 20 can identify when four digits are dialed. The four digits are in turn separated into two digit codes by the sequence detector 30. These signals are then suitably gated by means of the gating 32. When the switch 36 is closed onto the terminal 36, the signal from the gating causes the frequency detector 38 to emit a particular frequency onto the line 40 which in turn is sent onto the telephone line through the telephone jack 12.

More specifically, assume that the switching dials 22–28 are set so that dials 22 and 24 encode the number "38" and the dials 26 and 28 encode the number "42". When the two digits 3 and 8 are dailed onto the telephone line, these will be detected and converted into specific numbers. The switching unit 20 will then pass these two numbers 3 and 8. The sequence detector 30 will be sure that the sequence of the two numbers is such that the 8 follows the 3. It will then cause the gating signal 32 to cause the frequency detector 38 to emit a beep signal.

Similarly, when the two digits 4 and 2 are dialed, the switching unit 20 will likewise detect these numbers and as long as they are in the proper sequence as determined by the sequence detector 30, a suitable gating signal will be sent to the frequency detector 38 to emit another frequency signal.

It is noted that the particular device described can accommodate two beeper signals and accordingly encodes two different coded numbers for this purpose. One of the beep signals will be used to rewind and list out the messages. The other beep signal will be used to backspace, and/or to permit changing of the message on the telephone answering apparatus.

Should any other numbers be dialed, the switching unit 20 will not emit an output signal. Should these same numbers be dialed, however should the sequence be altered, then the sequence detector will not emit a signal. Thus, only the preselected digits forming the particular two coded numbers will cause the proper signals to be generated from the gating unit 32 to cause the frequency detector 38 to place those beep signals on the line.

The particular telephone answering apparatus which is utilized, responds to the beep signals on the telephone line in order to rewind and play back the messages or with the second beep signal to backspace and permit changing of the message. The telephone answering apparatus does not care from where the beep signals originate as long as the beep signals are on the line. The telephone answering apparatus will receive the beep signals from the line. Thus, using the present beeper simulator, all that is needed is for a user to know the particular coded numbers. He can then use any standard multifrequency type telephone to dial up the particular digits forming the encoded numbers. He does not have to carry his beeper and sound the beeper onto the telephone line. By dialing up the particular encoded numbers, he will cause the beeper simulator shown in FIG. 1 to emit the particular frequencies onto the telephone line in place of his generating the beeper signals with his own beeper device.

In this manner, the present beeper simulator shown in FIG. 1 can be installed near the telephone answering apparatus and the user can now disregard carrying the standard beeper device and only dial up the particular encoded numbers to cause the beeper simulator to generate the beep signals.

By using the particular dials 22–28, the codes can be changed at the will of the user. Therefore, in order to maintain suitable secrecy, whenever he desires he can change the particular codes and he, or whoever he tells, will be the only ones knowing the code which will cause the beeper simulator to generate beep signals.

Each telephone answering apparatus usually responds to a particular beep of a particular frequency. It is therefore necessary that the beeper simulator shown in FIG. 1 should produce that unique beep frequency to which the telephone answering apparatus will respond. It is therefore provided to initialize the frequency detector 38 so that it will produce the exact beep frequency required by the particular telephone answering apparatus. In order to do this, the switch 34 is disconnected from terminal 36. The frequency detector is connected to an input microphone 42 and includes a frequency adjusting device 44. The standard beeper device associated with the particular telephone answering apparatus is placed adjacent to the input microphone 42 so the particular beep from the device is emitted. The frequency adjust 44 is then adjusted so that the frequency detector 38 produces the identical frequency. This identical frequency can be checked by means of the indicator 46 which provides an output when the frequency of the detector 38 is the same as the frequency of the beeper device being inputted to the microphone 42.

By providing two circuits within the frequency detector, each of which emit a particular beep frequency, both beep signals can be reproduced by the simulator shown in FIG. 1.

Once the suitable beep frequencies of the device have been set on the frequency detector 38, the switch 34 is again replaced and the device is ready for utilization in conjunction with the particular telephone answering apparatus to which it has been initialized.

It is therefore appreciated that the particular beeper simulator shown in FIG. 1 can be utilized in conjunction with any telephone answering apparatus which has its own beeper device. The beeper simulator can be made to duplicate any particular beeper frequency needed for the particular telephone answering apparatus. Furthermore, the particular code to be dialed is determined by the user and can be changed by the user at will.

A particular circuit embodiment for implementing the device shown in FIG. 1 will now be described in connection with FIG. 2. The telephone jacks 48, 50 are standard telephone jacks. A capacitor 52 is connected to one of the terminals whose other end is connected to ground 54 so that the telephone itself is floating and is not grounded. The input to the device is taken on line 56 which passes through an input coupling capacitor 58 and an impedance 60 serving as the input to a discriminator unit 62. By way of example, the discriminator 62 can be be a standard chip identified by AM1, S3525A. The specific interconnections shown are standard for such type of discriminator. These discriminators detect multitone frequencies of the type dialed by a Touch-Tone System. The variable potentiometer 64 is interconnected to adjust the gain of the input to the chip 62. The crystal 66 is interconnected with a parallel impedance 68 in order to control the timing of the device.

At the output, there is provided a standard RC filter unit 70 which is set for the particular frequencies of the mutlitone Touch Tone System. Specifically, there is included the capacitor 72 in parallel with the resistor 74. There is a combination of three resistors 76, 78, 80 interconnected in a $\pi$. This is again repeated with an additional capacitor 82 in parallel with the resistor 84 and an additional $\pi$ network of resistors 86, 88 and 90. There is also provided the additional capacitor 92. At the upper end, various terminals of the chip are interconnected at 94. The output of the filter network is connected through the coupling capacitor 95 to the positive voltage + V with the other end grounded through the capacitor 96 connected to ground 98. The chip itself is also connected to a positive voltage through line 100 with a suitable ground provided through line 102.

It should be appreciated, that all of the particular interconnections shown are standard with this type of chip and are utilized in order to make the discriminator chip operative to detect the various multitone frequencies.

The output from the chip 62 passes to another chip 104 serving as a converter from frequencies to binary digits. The particular circuit chip 104 is a Mostek-MK5102A. The input is provided on lines 91 and 93 representing the two frequencies detected which represent the particular digit having been dialed. The output is provided in the standard binary on lines 106. These are shown as the four binary lines ABCD. A positive voltage is applied to the chip 104 on line 108 with a ground provided at 110.

The standard binary output on lines 106 is provided to a binary a decimal converter 112 which is a chip No. CD4028. The output from this chip is a standard signal provided on the ten lines 114 representing a decimal output. The positive voltage is provided to the chip 112 on line 116 and the ground is provided at 118.

The outputs on the lines 114 representing the decimal digital dialed onto the telephone line is sent in parallel to the four switches S1-S4. All of these switches are standard minidip switches which are externally presettable by closing particular ones of the closure switches 120 on each of the switches S1-S4. Specifically, the switches S1 and S2 are preset to represent two digits encoding a first number which is to produce a first beeper tone. Switches S3 and S4 are preset by closing specific ones of their switches 120 to represent the two digits of a second encoded number which is to produce a second beeper signal. The first beeper signal produced by the two numbers on the switches S1 and S2 can be used for rewinding and listing out of the messages on the telephone answering apparatus. The two digits representing the second encoded number will produce the beeper signal for backspace and changing of the outgoing message.

The output from switch 1 appears at line 122 and provides a first input to a sequence detector 124 shown as a gating chip of the standard type No. CD4043. There are four inputs provided to this chip 124. The first and second appear on lines 122 and 126. The third and fourth appear as the output of switches S3 and S4 on lines 128 and 130. When an output appears in sequence on lines 122 and 126, it causes the chip 124 to produce a signal on lines 132 and 134. Similarly, when inputs are provided on lines 128 and 130, the chip 124 will produce an output on lines 136, and 138.

Accordingly, depending on how the switches S1-S4 are preset, will determine whether the chip 124 produces an output. If the two digits representing the first encoded number are dialed, the circuitry will detect it so that switches S1 and S2 produce outputs and lines 122 and 126 will have inputs whereby there will be a signal present on lines 132 and 134. These in turn will be sent to the gate 140. An additional gate 142 is provided which receives the outputs on lines 136 and 138 representing the presence of suitably dialed digits representing the second encoded number. The two gates 140, 142 can be part of a chip 144 which can be a chip No. CD 4025.

In order to insure that no beep signal appears on the telephone line simultaneously with any digits being dialed into the line, an additional input is provided to the gates 140 and 142 on line 146. Line 146 is taken as an output from the frequency to binary digit converter 104. Accordingly, as long as digits are being dialed, and are detected by the discriminator chip 62 and accordingly converted to binary digits by the converter 104, the gates 140 and 142 will not produce an output. Only, when no digit is being dialed, will it be possible for the gates 140 and 142 to produce outputs.

The particular gating circuit 124 has a positive voltage supplied on line 148 and has a ground at 150. Similarly, the circuit 144 has its positive voltage provided on line 152 and a suitable ground at 154.

Figure 2:
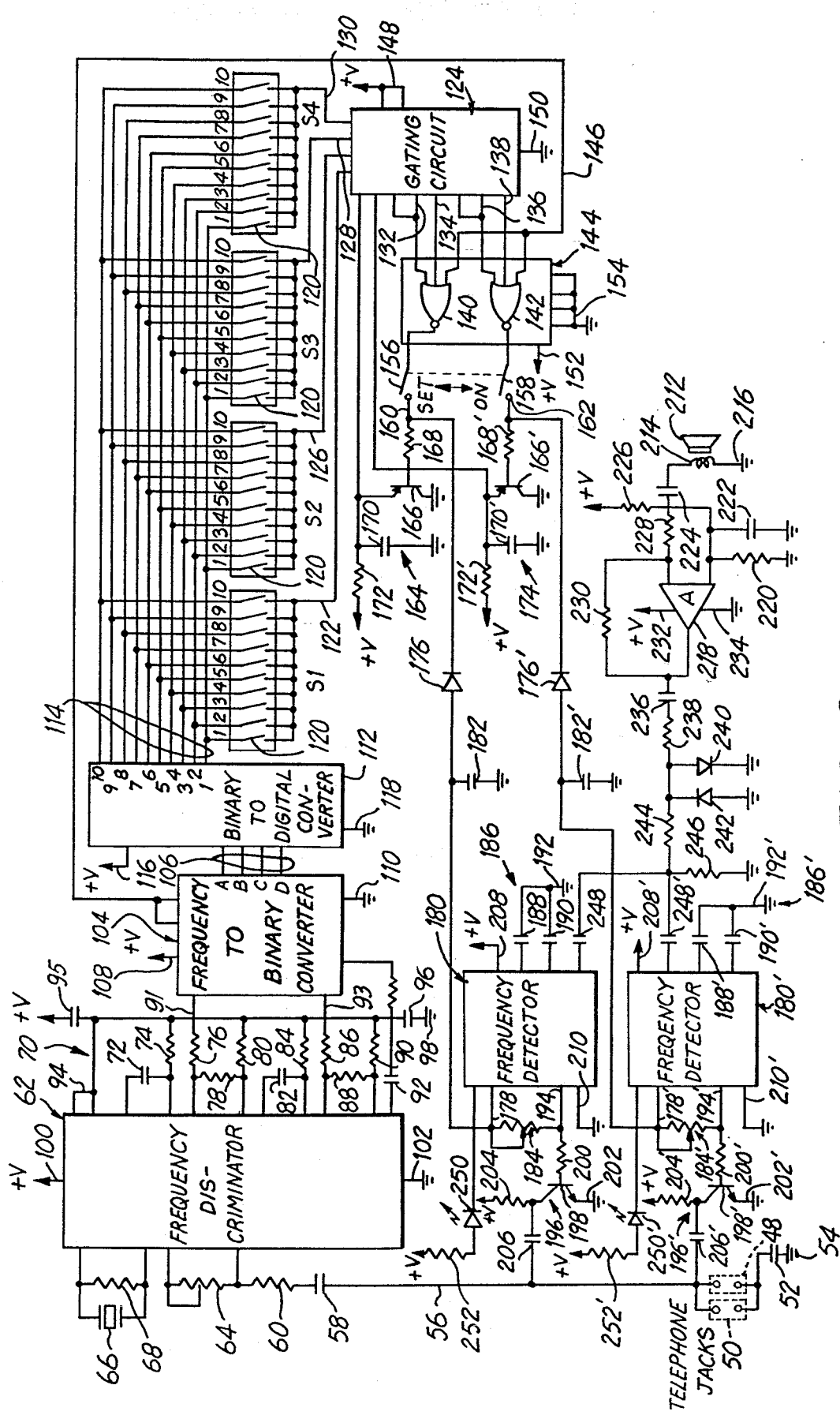
FIG. 2 is a detailed circuit diagram showing the implementation of the block diagram circuit shown in FIG. 1.

When the beeper simulator of FIG. 2 is being utilized, the two ganged switches 156, 158 are placed in their lower positions so that they respectively contact the terminals 160, 162.

Connected to terminal 160 is a timing circuit 164 including a transistor 166 having a base resistance 168 connected to the terminal and including a time setting RC network including the capacitor 170 and the resistor 172 whose other end is connected to the positive voltage. This permits the provision of a time delay for determining the length of the beep on the line. A similar time delay circuit 174 is provided connected to the terminal 162. It should be appreciated, that on terminal 160 is the signal for the first beeper sound and on terminal 162 is the signal for the second beeper sound. Therefore, the time delay circuits 164 and 174 are respectively connected to these terminals to determine the length of time that the beeper signals will be on the line.

The elements of the circuit 174 are identically identified as the elements of the circuit 164 with the addition of a prime being placed after each number.

The signal on terminal 160 passes through a blocking diode 176 and is fed as a input on line 178 to an integrated circuit chip 180. The chip 180 is frequency detector which includes an internal phase lock loop. Typically, this circuit can be a chip member LM567N. This circuit produces a particular frequency output as set by means of the capacitor 182 and the adjustable potentiometer 184. A suitable filter 186 is connected at the output, as is standard procedure, including the capacitors 188 and 190 whose other terminals are connected to ground 192.

When a signal is provided on terminal 160 it causes the frequency device 180 to produce a beeper signal whose output is sent on line 194 through the amplifier shown generally at 196 and back onto the telephone through line 56 and the telephone jacks. The amplifier 196 includes a transistor 198 with a base impedance 200, a grounded emitter 202, and a collector resistance 204 coupling the collector to the positive voltage. A coupling capacitor 206 connects the amplifier to the line 56. A positive voltage is provided to the circuit 180 along line 208 and a suitable ground 210 is also provided.

Accordingly, when the signal on line 160 appears at the input to the circuit 180, the beeper frequency will be produced and amplified by the amplifier 196 to be sent onto the line. In this manner, by dialing the proper digits representing the first encoded number as set by the switches S1 and S2, a beeper frequency will be placed on the telephone line. The telephone answering apparatus will not know that the beeper simulator is producing the signal and will react just as if the beeper was being utilized by the user himself at a remote location.

The signal on line 162 will similarly cause a different beeper frequency to be produced from a second frequency detector. The second frequency detector is identified as the circuit chip 180' and all components are identified in a manner identical to the chip 180 with the addition of the prime.

In order to be sure that the frequency detectors 180 and 180' produce the proper signals, they have to be initialized by the actual beeper device itself. For this purpose there is utilized an input microphone 212 connected by means of a suitable inductor 214 whose one end is grounded 216. The output from the microphone is sent through an amplifier 218. The amplifier typically includes the biasing by means of the resistor 220 and capacitor 222 and suitable coupling capacitors 224. The necessary input resistors 226 coupled to the positive voltage supply feed one input to the amplifier and the resistor 228 serves as the connection of the other input of the amplifier. A feedback resistor 230 is also shown. The proper biasing for the amplifier is provided on line 232 to the positive voltage and ground is provided on line 234.

The output from the amplifier 218 is sent through the output capacitor 236 and the resistor 238 and the output is suitably clipped by means of the two diodes 240 and 242. A suitable voltage division is provided by means of the voltage divider 244 and 246. This signal is then sent through a capacitor 248 to the frequency unit 180 and through a similar capacitor 248' to the unit 180'.

In setting the proper frequencies, the ganged switches 156 and 158 are moved upwardly to their set position so that they do not contact terminals 160 and 162. The frequency units 180 and 180' are then disconnected from the frequency detection units and do not detect signals dialed onto the line. The actual beeper device itself is then held near the input microphone 212. The first beep is emitted from the unit and the frequency detector has its frequency adjusted by means of the potentiometer 184. When the frequency emitted from the detector 180 equals the actual beeper frequency, the light emitting diode 250, will produce an output signal. The other end of the light emitting diode is connected through the resistor 252 to the positive voltage supply. Once the emitter 250 indicates illumination, the frequency unit 180 will now be providing the same frequency as the beeper unit itself.

The actual beeper device is then used to produce the second beeper signal. This time the adjustable potentiometer 184' is used to adjust the frequency of the circuit 180' so that it is identical to the beeper unit. The light emitting diode 250' will produce a suitable visible indication that the frequencies are identical.

Once the two frequencies of the circuits 180 and 180' have been initialized to produce the desired output beeper signals, the switches 156 and 158 are returned to their normal position respectively contacting the terminals 160 and 162 and the device is ready for use.

Figure 3:
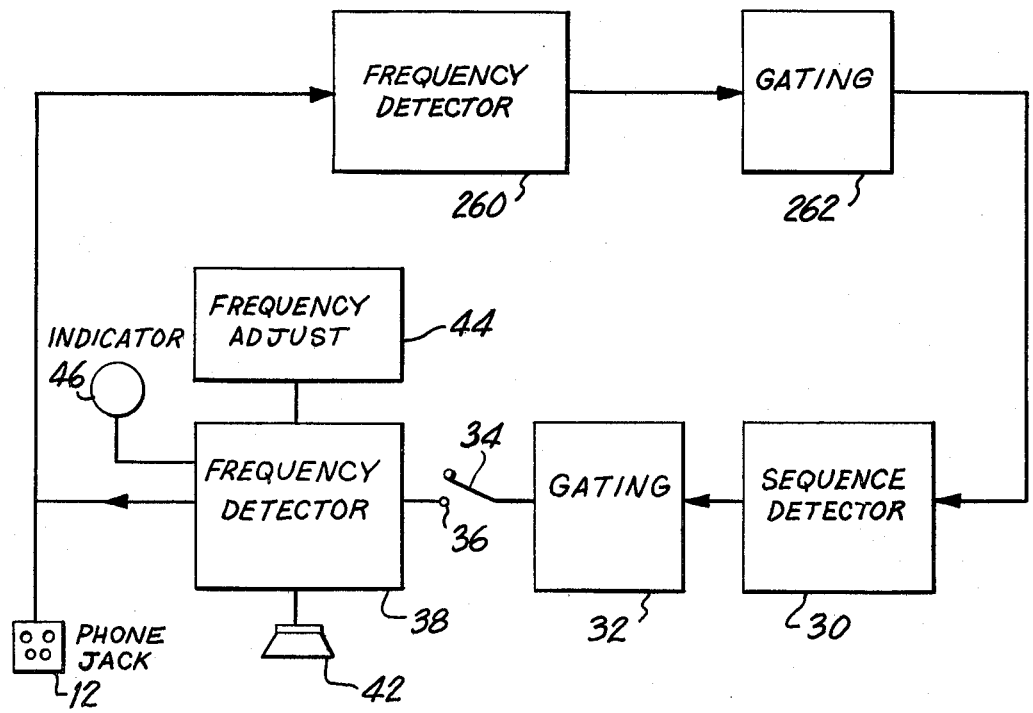
FIG. 3 is a block diagram explaining the operation of the present invention in accordance with a simplified aspect.

Referring now to FIG. 3, another embodiment of the beeper simulator is shown. This device is substantially similar to the device described in connection with FIG. 1, however, it does not permit the user selection of the particular digits for operating the device. Instead, it provides for frequency detectors 260 which are preset by the manufacturer to detect particular frequencies representing the encoded digits. The frequency detectors are set to respond only to the particular frequencies constituting the particular multitone frequencies of the digits preset. Accordingly, if a particular digit has been set by the manufacturer as being recognized by this device, the frequency detectors 260 will be set to detect the two frequencies constituting this particular digit.

The output from the frequency detectors 260 is sent to a gating unit 262 for sorting the frequencies to be sure that they are the proper frequencies representing the particular digits. The output from the gating is then sent to a sequence detector 30 of the type shown in FIG. 1. The remaining portions of the circuit of FIG. 3 are identical to that shown in FIG. 1 and accordingly will not be described. It is understood that all of the description explained with respect to FIG. 1 will apply to the circuit shown in FIG. 3. It is thus appreciated that the circuit of FIG. 3 operates substantially the same as that shown in FIG. 1 except that rather than permit the user to select and modify the particular digits forming the encoded numbers, these are preset by the manufacturer. Of course, each unit sent out by the manufacturer will respond to different numbers and these numbers will be assigned only to a particular unit. The numbers will be given to the purchaser so that he will know which numbers will operate his beeper simulator. However, he will not be able to change those numbers at will.

Figure 4:
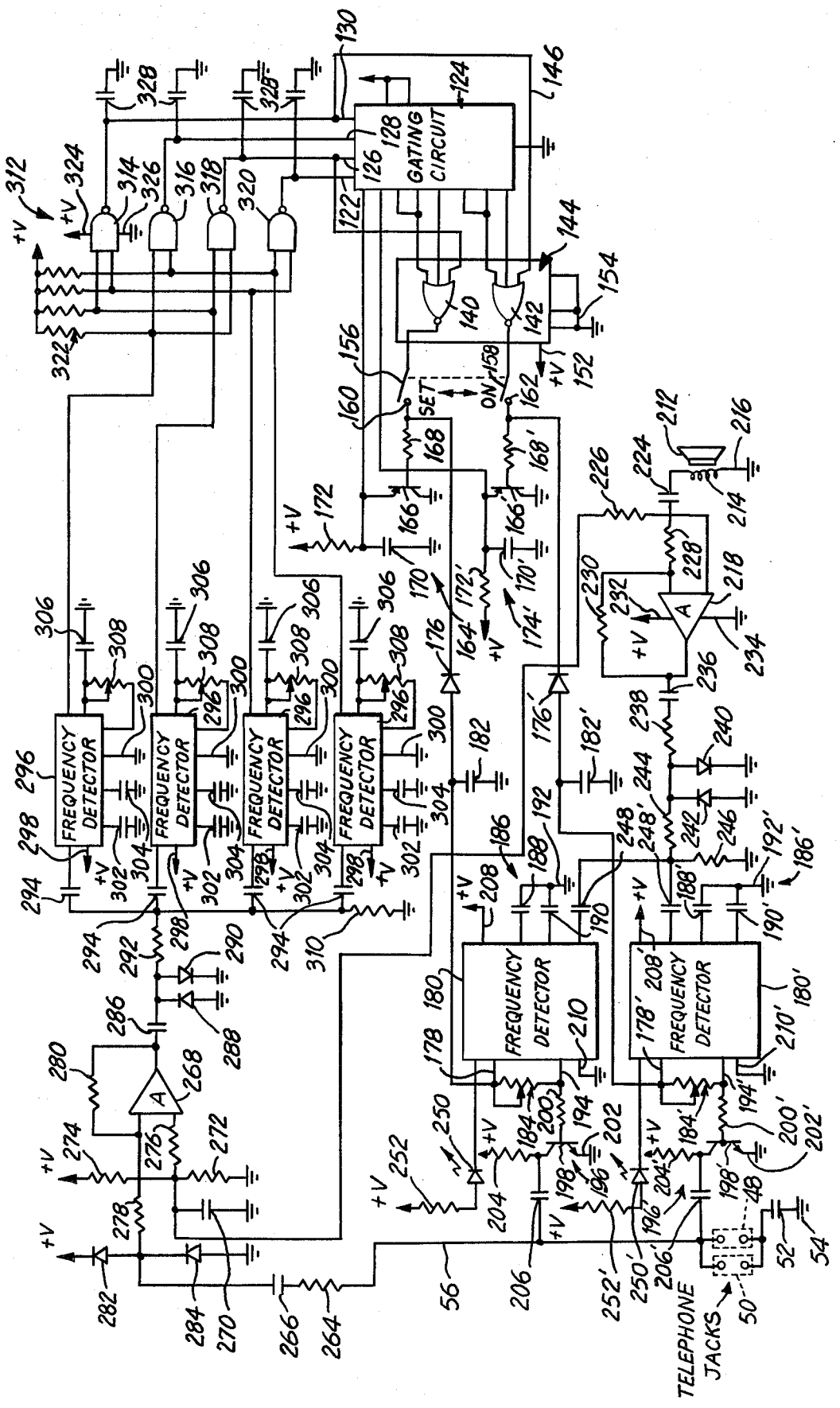
FIG. 4 is a detailed circuit diagram of the block diagram shown in FIG. 3.

A particular detailed circuit for carrying out the embodiment of FIG. 3 is now shown in FIG. 4. It should be noted, that only those parts of FIG. 4 which differ from FIG. 2 will be described in detail, the remaining parts will be identified identically to that shown in FIG. 2 and the explanation of the operation thereof will be identical to that heretofore explained in connection with FIG. 2.

In FIG. 4, the output from the telephone jacks 48, 50 on line 56 passes through an input impedance 264 and a coupling capacitor 266 for entry into an amplifier 268. The amplifier typically includes the standard biasing capacitor and resistor 270, 272 whose other ends are grounded. It also includes the resistors 274 and 276 having one end coupled to the positive voltage supply and the other end coupled to one input of the amplifier 268. The other input to the amplifier from the telephone line itself passes through the resistor 278. A feedback capacitor 280 is also provided. The diodes 282 and 284 respectively connected to the positive voltage supply and to ground provide the necessary clipping of the signal.

The output from the amplifier 268 passes through a coupling capacitor 286 and is again suitably clipped by the diodes 288, 290 and after passing through the input resistor 292 is fed through a respective input capacitor 294 to the four frequency detectors 296. Each of the frequency detectors 296 can be identical to the frequency detectors 180 and 180' shown in FIG. 2 and specifically can be of integrated circuit chip numbers LM567N.

Each of the circuits 296 is provided with a positive voltage on line 298 and a suitable ground at 300. Additionally, the necessary filter is provided by means of the capacitors 302 and 304. The particular frequency to which the circuit 296 is tuned is provided by means of the capacitor and resistor network 306 and 308. The capacitor 306 has one end grounded. The resistor 308 is of the adjustable potentiometer type whereby the particular frequency can be selected by varying the potentiometer 308. The input to each of the circuits 296 is connected through a capacitor 310 to ground.

As is well known, using the Touch-Tone System, the horizontal numbers of the Touch-Tone pad represent the low frequency and the vertical columns of the Touch Tone pad represent the higher frequency. Accordingly, each number is formed of two frequency tones, one of which represents the low frequency and the other represents the high frequency. Accordingly, four digits on the Touch Tone pad can be represented by the combination of two low frequencies and two high frequencies. Combining these in the four unique possibilities will be able to identify four unique digits. Accordingly, by the use of four frequency units 296 of the type heretofore described, with two of them representing low frequencies and two representing high frequencies, it is possible to identify four separate digits. Of course, other combinations could be utilized where one digit is repeated in the combination. However, nonetheless, using four different frequencies, various multiple combination of digits can be achieved.

Accordingly, in order to provide a simplified, reduced cost beeper simulator, it is only necessary to utilize four frequency units 296 each of which detects one frequency, either a low or high frequency. By using such four frequency detectors 296, each of which is set at a different frequency, four digits can be identified.

The outputs from the units 296 are sent to the four gates 312. The four gates can be four parts of a single gating chip identified as CD4001. The outputs from the frequency detectors 296 are suitably sent so that two outputs are sent to each one gate. Thus, the uppermost gate 314 is shown to be receiving as its inputs the output from the second frequency detector and the third frequency detector. The second gate 316 receives as its inputs the output from the first detector and the fourth detector. Gate 318 receives as its input signals from the first and second unit and the final gate 320 receives inputs from the third and fourth units. Accordingly, each of the four gates 314, 320 receives a unique combination of two of the frequency detectors. Thus, when a particular digit is dialed, it emits two frequencies, a low and high frequency. If those two frequencies are of the ones being detected by the frequency detectors 296, they will produce outputs. Those two outputs will be sent to a particular one of the gates whereby that gate will produce an output signal.

The inputs to the gates are connected through resistors 322 to the positive voltage supply. Also, the gating unit itself is provided with positive voltage on line 324 and ground on 326. The outputs from the gates are coupled to ground with a suitable capacitor 328. The output from the last gate 320 sends its signals on line 122. Similarly, the output from gate 318 is on line 126 while the gate 316 provides its output on line 128 and gate 314 has its output on line 130. It will be remembered that these four lines represent the input to the sequence detector 124 heretofore described in FIG. 2. Thus, when the gate 320 detects as its input that the two frequency detectors 296 have recognized the frequencies of the particular first digit, an output will be sent on line 122. When the proper output appears on line 126, the sequence detector 124 will then produce its output which will be sent through the gating 140, as heretofore described in connection with FIG. 2.

The signal on line 146 providing an indication that no digits have been dialed is taken from line 130 at the output of gate 314.

All of the remaining parts of FIG. 4 are identical to that of FIG. 2 and are accordingly, identically identified as such. It is therefore appreciated that the circuit of FIG. 4 will operate the same as FIG. 2. However, instead of being able to fix the digits dialed which are encoded for response by the beeper simulator, the frequency detectors 296 in conjunction with the gating units 312 is preset so that particular digits will operate this particular beeper simulator. Of course, by modifying the frequency of the detectors 296 as well as the combinations of these outputs in the gating 312, each beeper simulator can be different from another beeper simulator so that it is not always the same numbers operating all of the beeper simulators being sold.

Although there was described the beeper simulator for use with two beeper signals, it should be understood that the unit will operate with only one beeper frequency being produced. Furthermore, if more frequencies are needed, additional units of the frequency detectors would be provided.

There has been disclosed heretofore the best embodiments of the invention presently contemplated. However, it is to be understood that various changes and modifications may be made thereto without departing from the spirit of the invention.

We claim:

1. A beeper simulator for simulating the beeper signal of a beeper device associated with a telephone answering apparatus, comprising:
    detecting means for interconnection to a telephone line for detecting digits entered onto the telephone line by a caller representing a coded number, and
    signal generating means for interconnection through the telephone line, responsive to the detection of the coded number by the detecting means, for producing onto the telephone line an output beeper signal required for operation of the telephone answering apparatus.

2. A beeper simulator as in claim 1, and comprising signal setting means coupled to said signal generating means and responsive to an output signal from the beeper device being simulated, for setting said output beeper signal equal to the output signal of the beeper device being simulated.

3. A beeper simulator as in claim 2, and comprising code setting means coupled to said detecting means for selectively setting particular digits as the ones being detected.

4. A beeper simulator as in claim 2, wherein said digits entered into the telephone line are of the multifrequency tone type, and wherein said detecting means comprises frequency detection means.

5. A beeper simulator as in claim 4, wherein said detecting means comprises discrimination means for separating said multifrequency tones of each digit entered into individual tones, converter means for converting the discriminated individual tones into a decimal, and switch means for producing an output only in response to preset decimal numbers.

6. A beeper simulator as in claim 5, wherein said switch means comprises selective setting means for selectively determining said preset coded number.

7. A beeper simulator as in claim 6, and comprising four selective setting means, whereby two pairs of two digit numbers can be selected respectively to define two coded numbers of two digits each.

8. A beeper simulator as in claim 4, wherein said frequency detection means produces an output only in response to preset frequencies, whereby only particular digits entered will be detected.

9. A beeper simulator as in claim 8, wherein said multifrequency tones are of the dual-tone multifrequency type, and wherein four preset frequencies are detected, whereby two pairs of two digit numbers can be selected to respectively define two coded numbers of two digits each.

10. A beeper simulator as in claim 2, wherein said signal generating means comprises gating means for producing an output upon receiving two predetermined digits from a specified sequence to form a preselected coded number, and frequency generating means responsive to said output for generating said beeper signal.

11. A beeper simulator as in claim 10, wherein said gating means comprises means for preventing the generation of said beeper signal until after the entry of the digits onto the telephone line.

12. A beeper simulator as in claim 10, and comprising timing means for controlling the length of said beeper signal on the line.

13. A beeper simulator as in claim 10, wherein said signal setting means comprises an input microphone for receiving the output signal from the beeper device being simulated and coupled to said frequency generating means said frequency generating means comprising adjusting means for adjusting the frequency output of the frequency generating means, frequency detector means for comparing the frequency of said frequency generating means with that of the signal coupled by said input microphone and indicator means for providing an indication of an equal comparison.

14. A beeper simulator as in claim 13, and further comprising switch means for selectively coupling said frequency generator means means to said gating means during actual operation and for decoupling it from said gating means during a frequency setting operation.

15. A beeper simulator as in claim 9, and further comprising gate means for combining said four detected frequencies into four different combinations thereof to thereby obtain four dual-tone multifrequency digits.

* * * * *